United States Patent
Prajapati et al.

(10) Patent No.: US 12,547,506 B1
(45) Date of Patent: Feb. 10, 2026

(54) AUTOMATED DATA PROTECTION WORKFLOW FOR CONTAINERIZED APPLICATIONS

(71) Applicant: International Business Machines Corporation, Armonk, NY (US)

(72) Inventors: Sandeep Kumar Prajapati, Pune (IN); James Patrick Smith, Redwood City, CA (US); Lisa Anne Huston, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/897,868

(22) Filed: Sep. 26, 2024

(51) Int. Cl.
*G06F 11/14* (2006.01)
*G06F 11/1446* (2026.01)

(52) U.S. Cl.
CPC ...... *G06F 11/1469* (2013.01); *G06F 2201/80* (2013.01)

(58) Field of Classification Search
CPC .......................... G06F 11/1469; G06F 2201/80
See application file for complete search history.

(56) References Cited

U.S. PATENT DOCUMENTS

| | | | |
|---|---|---|---|
| 11,288,130 B2 | 3/2022 | Balcha | |
| 11,321,188 B2 | 5/2022 | Mitkar | |
| 11,343,282 B2 | 5/2022 | Bett | |
| 11,573,867 B2 | 2/2023 | Rhodes | |
| 11,880,282 B2 | 1/2024 | Balcha | |
| 2021/0011816 A1 | 1/2021 | Mitkar | |
| 2021/0149769 A1 | 5/2021 | Balcha | |
| 2021/0342214 A1* | 11/2021 | Madawat | ............ G06F 11/3006 |
| 2025/0080475 A1* | 3/2025 | Sampath | ............... H04L 47/746 |

FOREIGN PATENT DOCUMENTS

| | | |
|---|---|---|
| CN | 112099989 A | 12/2020 |
| WO | 2022189839 A1 | 9/2022 |
| WO | 2022189840 A1 | 9/2022 |
| WO | 2022231664 A1 | 11/2022 |

\* cited by examiner

*Primary Examiner* — Apu M Mofiz
*Assistant Examiner* — Cindy Nguyen
(74) *Attorney, Agent, or Firm* — Amin, Turocy & Watson, LLP

(57) ABSTRACT

A system includes a processor that executes computer executable components stored in a memory. The computer executable components include an application identification component that identifies a new imperative application where recovery workflow for the new imperative application is unavailable. The computer executable components include an analysis component that analyzes the new imperative application to determine resources required to be protected; the analysis component determines an order of steps to be performed within a workflow to guarantee recovery of the new imperative application. The computer executable components include a recovery design component that utilizes a subset of legacy recovery plans to create, at least in part, a preliminary recovery plan for the new imperative application; the recovery design component tests the preliminary recovery plan and iteratively updates the preliminary recovery plan until a failure-free recovery plan is developed for the new imperative application.

20 Claims, 14 Drawing Sheets

Relational DB1: is the first application for recovery. As part of "Process an application" different application resources are identified either by looking at cluster or its deployment. Then recovery workflow is created using all application resources and default patten from the database. Current state of database is as -

Initial DB state:
Schema0: 1 | P1
Schema1: _ | _ | 0/0 | _
Schema2: _ | _

Now apply the pattern and start the recovery. In this case, recovery has fail as it has created new PVCs along with backed up PVCs. Leading to inaccessibility of back up data. This happened as operator did not find the PVCs and went ahead with creation. Next step is to record the errors and create/choose another rule/pattern for recovery i.e. recover the PVCs first then all other application resources. When this pattern is included in the recovery workflow, it lead to successful application recovery. Finally, patterns learnt and errors are fed into the database as below —

Schema1: _ | P1 | 0/0 | _
"Duplicate PVCs" | P2 | 1/1 | Relational DB1
Schema2: Relational DB1 | P1, P2

FIG. 7

Relational DB2: For this application, database already have a working pattern as below –

Initial DB state:
Schema1: _ | P1 | 0/0 | _
  "Duplicate PVCs" | P2 | 1/1 | Relational DB1

Schema2: Relational DB1| P2

After processing the application, pattern is taken into consideration and recovery workflow is created. Next created workflow is applied into the cluster and recovery is started. Recovery has completed successfully except in "Catalog Source not found" reported in user interface (UI). To overcome this, either correct the owner references and restart the Pod or skip the ClusterServiceVersion(CSVs). In the next iteration, "skip CVS is applied" resulting successful recovery of the application. In the end, new patterns learnt are recorded in database as –

Resulting DB State:
Schema1: _ | P1 | 0/0 | _
  "Duplicate PVCs" | P2 | 2/2 | Relational DB1, Relational DB2
  "Catalog Source Not found" | P3 | 1/1 | Relational DB2

Schema2: Relational DB1| P2
  Relational DB2| P2, P3

FIG. 8

Non-Relational DB1: In this similar process is followed and a new pattern is learnt (restore single PVC from ReplicaSet) while avoiding previous applications errors.

Initial DB state:
Schema1: _ | P1 | 0/0 | _
         "Duplicate PVCs" | P2 | 2/2 | Relational DB1, Relational DB2
         "Catalog Source Not found" | P3 | 1/1 | Relational DB2

Schema2: Relational DB1 | P2
         Relational DB2 | P2, P3

Resulting DB State:
Schema1: _ | P1 | 0/0 | _
         "Duplicate PVCs" | P2 | 3/3 | Relational DB1, Relational DB2, Non-Relational DB1
         "Catalog Source Not found" | P3 | 2/2 | Relational DB2, Non-Relational DB1
         "ReplicaSet PVC" | P4 | 1/1 | Non-Relational DB1

Schema2: Relational DB1 | P2
         Relational DB2 | P2, P3
         Non-Relational DB1 | P2, P3, P4

FIG. 9

Non-Relational DB2: It founds two other patterns and re-usages previous ones thereby avoiding multiple trails.

Initial DB State:
Schema1: _ | P1 | 0/0 | _
        "Duplicate PVCs" | P2 | 3/3 | Relational DB1, Relational DB2, Non-Relational DB1
        "Catalog Source Not found" | P3 | 2/2 | Relational DB2, Non-Relational DB1
        "ReplicaSet PVC" | P4 | 1/1 | Non-Relational DB1
Schema2: Relational DB1 | P2
        Relational DB2 | P2, P3
        Non-Relational DB1 | P2, P3, P4

Intermediate DB State:
Schema1: _ | P1 | 0/0 | _
        "Duplicate PVCs" | P2 | 4/4 | Relational DB1, Relational DB2, Non-Relational DB1, Non-Relational DB2
        "Catalog Source Not found"| P3 | 2/2 | Relational DB2, Non-Relational DB1
        "ReplicaSet PVC"| P4 | 1/1 | Non-Relational DB1
        "Incorrect Pod (instance) state"| P5 | 1/1 | Non-Relational DB2
Schema2: Relational DB1 | P2
        Relational DB2 | P2, P3
        Non-Relational DB1 | P2, P3, P4
        Non-Relational DB2 | P2, P5

Resulting DB State:
Schema1: _ | P1 | 0/0 | _
        "Duplicate PVCs" | P2 | 4/4 | Relational DB1, Relational DB2, Non-Relational DB1, Non-Relational DB2
        "Catalog Source Not found"| P3 | 2/2 | Relational DB2, Non-Relational DB1
        "ReplicaSet PVC"| P4 | 1/1 | Non-Relational DB1
        "Incorrect Pod (instance) state"| P5 | 1/1 | Non-Relational DB2
        "Skip events during recovery" | P6 | 4/4 | Relational DB1, Relational DB2, Non-Relational DB1, Non-Relational DB2
Schema2: Relational DB1 | P2, P6
        Relational DB2 | P2, P3, P6
        Non-Relational DB1 | P2, P3, P4, P6
        Non-Relational DB2 | P2, P5, P6

FIG. 10

Relational DB3: It inherits patterns from Relational DB2 and Non-Relational DB1, leading its successfully recovery.

Resulting DB State:
Schema1: _ | P1 | 0/0 | _
"Duplicate PVCs" | P2 | 5/5 | Relational DB1, Relational DB2, Non-Relational DB1, Non-Relational DB2, Relational DB3
"Catalog Source Not found" | P3 | 3/3 | Relational DB2, Non-Relational DB1, Relational DB3
"ReplicaSet PVC" | P4 | 2/2 | Non-Relational DB1, Relational DB3
"Incorrect Pod (instance) state" | P5 | 1/1 | Non-Relational DB2
"Skip events during recovery" | P6 | 5/5 | Relational DB1, Db2, Non-Relational DB1, Non-Relational DB2, Relational DB3

Schema2: Relational DB1 | P2, P6
Relational DB2 | P2, P3, P6
Non-Relational DB1 | P2, P3, P4, P6
Non-Relational DB2 | P2, P5, P6
Relational DB3 | P2, P3, P4, P6

FIG. 11

Non-Relational DB3: Its behaviour is similar to previous applications, additionally it skips Formation and FormationLock resource Resulting DB State:

Schema1: | P1 | 0/0 | _
"Duplicate PVCs" | P2 | 6/6 | Relational DB1, Relational DB2, Non-Relational DB1, Non-Relational DB2, Relational DB3, Non-Relational DB3
"Catalog Source Not found" | P3 | 4/4 | Relational DB2, Non-Relational DB1, Relational DB3
"ReplicaSet PVC" | P4 | 2/2 | Non-Relational DB1, Relational DB3
"Incorrect Pod (instance) state" | P5 | 2/2 | Non-Relational DB2, Non-Relational DB3
"Skip events during recovery" | P6 | 6/6 | Relational DB1, Relational DB2, Non-Relational DB1, Non-Relational DB2, Relational DB3, Non-Relational DB3
"Skip Formation and FormationLock resource during recovery" | P3 | Non-Relational DB3

Schema2: Relational DB1 | P2, P6
Relational DB2 | P2, P3, P6
Non-Relational DB1 | P2, P3, P4, P6
Non-Relational DB2 | P2, P5, P6
Relational DB3 | P2, P3, P4, P6
Non-Relational DB3 | P2, P3, P5, P6

FIG. 12

APP1: In this only key resources are restored in an order, and introduces three new patterns Resulting DB State:
Schema1: _ | P1 | 0/0 | _
"Duplicate PVCs" | P2 | 7/7 | Relational DB1, Relational DB2, Non-Relational DB1, Non-Relational DB2, Relational DB3, Non-Relational DB3, APP1
"Catalog Source Not found" | P3 | 4/4 | Relational DB2, Non-Relational DB1, Relational DB3
"ReplicaSet PVC" | P4 | 2/2 | Non-Relational DB1, Relational DB3
"Incorrect Pod (instance) state" | P5 | 3/3 | Non-Relational DB2, Non-Relational DB3, APP1
"Skip events during recovery" | P6 | 7/7 | Relational DB1, Relational DB2, Non-Relational DB1, Non-Relational DB2, Relational DB3, Non-Relational DB3, APP1
"Skip Formation and FormationLock resource during recovery" | P3 | Non-Relational DB3
"Restore key resources in an order" | P7 | 1/1 | APP1
"Incorrect state on resource - overwrite" | P8 | 1/1 | APP1
"Skip PVC recovery - no key data" | P9 | 1/1 | APP1

Schema2: Relational DB1 | P2, P6
Relational DB2 | P2, P3, P6
Non-Relational DB1 | P2, P3, P4, P6
Non-Relational DB2 | P2, P5, P6
Relational DB3 | P2, P3, P4, P6
Non-Relational DB3 | P2, P3, P5, P6
APP1 | P2, P5, P6, P7, P8, P9

FIG. 13

AUTOMATED DATA PROTECTION WORKFLOW FOR CONTAINERIZED APPLICATIONS

BACKGROUND

The subject disclosure relates to data protection plan generation, e.g., automated creation of data protection workflow for containerized applications.

Containers have transformed how applications are developed and deployed. They package applications and their dependencies into portable units, making it easier to build, ship, and run software across various environments. Containers, often managed by orchestration tools, offer flexibility and scalability that allow organizations to transform legacy systems into more adaptable, cloud-native solutions. Cloud computing provides scalable infrastructure and services required to host containerized applications efficiently. While cloud applications provide many advantages, there are issues concerning data security and availability. Preventing data loss is critical because cloud applications house significant volumes of vital data that can be vulnerable to accidental deletions, system failures, or cyberattacks.

Current data protection methods focus on moving data from containerized environments to storage targets. A major issue with these methods is that they fail to offer guidance on creating data protection plans tailored to specific application needs or on sequences required for successful recovery. With certain applications, it is not sufficient to simply restore data to a containerized system from a backup storage. For these applications to be recovered properly, certain artifacts must be restored in a prescribed order. Where these applications do not have known workflow artifacts, this can be a very difficult task, especially if a user doesn't have deep knowledge about the application.

SUMMARY

The following presents a summary to provide a basic understanding of some embodiments of the invention. This summary is not intended to identify key or critical elements or delineate any scope of the particular embodiments or any scope of the claims. Its sole purpose is to present concepts in a simplified form as a prelude to the more detailed description that is presented later. In some embodiments described herein, systems, computer-implemented methods, and/or computer program products that facilitate automated creation of data protection workflow for containerized applications are provided.

According to an embodiment, a system can comprise a processor that executes computer executable components stored in memory. The computer executable components can comprise an application identification component that identifies a new imperative application where recovery workflow for the new imperative application is unavailable. The computer executable components comprise an analysis component that analyzes the new imperative application to determine resources required to be protected to guarantee recovery of the new imperative application. The analysis component further determines an order of steps to be performed within a workflow to guarantee recovery of the new imperative application. The computer executable components can further comprise a recovery design component that utilizes a subset of legacy recovery plans to create at least in part a preliminary recovery plan for the new imperative application and test the preliminary recovery plan, and, upon failure of the preliminary recovery plan, iteratively update the preliminary recovery plan until a failure-free recovery plan is developed for the new imperative application.

According to another embodiment, a computer-implemented method can comprise identifying, by a system operatively coupled to a processor, a new imperative application where recovery workflow for the new imperative application is unavailable. The computer-implemented method comprises analyzing, by a system, the new imperative application to determine resources required to be protected to guarantee recovery of the new imperative application. The computer-implemented method further comprises analyzing, by a system, the new imperative application to determine an order of steps to be performed within a workflow to guarantee recovery of the new imperative application. The computer implemented method can further comprise utilizing, by the system, a subset of legacy recovery plans to create at least in part a preliminary recovery plan for the new imperative application, and test the preliminary recovery plan, and upon failure of the preliminary recovery plan, iteratively update the preliminary recovery plan until a failure-free recovery plan is developed for the new imperative application.

According to another embodiment, a computer program product comprising a computer readable storage medium having program instructions embodied therewith, the program instructions executable by a processor to cause the processor to identify, by the processor, a new imperative application where recovery workflow for the new imperative application is unavailable. The program instructions can also cause the processor to analyze, by the processor, the new imperative application to determine resources required to be protected to guarantee recovery of the new imperative application. The program instructions can also cause the processor to analyze, by the processor, the new imperative application to determine an order of steps to be performed within a workflow to guarantee recovery of the new imperative application. The program instructions can further cause the processor to utilize, by the processor, a subset of legacy recovery plans to create at least in part a preliminary recovery plan for the new imperative application, and test the preliminary recovery plan, and upon failure of the preliminary recovery plan, iteratively update the preliminary recovery plan until a failure-free recovery plan is developed for the new imperative application.

BRIEF DESCRIPTION OF THE DRAWINGS

FIGS. 7-13 illustrate example schema in accordance with some embodiments described herein.

DETAILED DESCRIPTION

Figure 1:
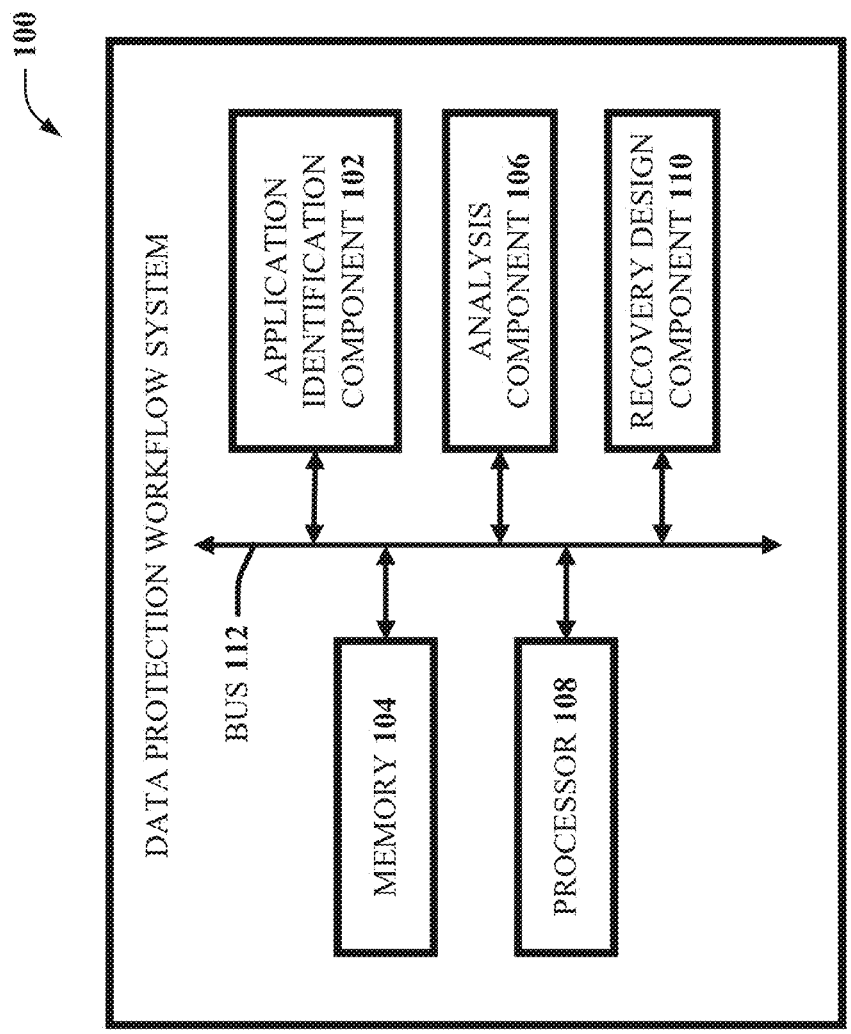
FIGS. 1 and 2 illustrate example systems that can facilitate automated creation of data protection workflow for containerized applications in accordance with some embodiments described herein.

The following detailed description is merely illustrative and is not intended to limit embodiments, applications, and/or uses of embodiments. Furthermore, there is no intention to be bound by any expressed or implied information presented in the preceding Background or Summary sections, or in the Detailed Description section.

Containers have transformed how applications are developed and deployed. They package applications and their dependencies into portable units, thus making it easier to build, ship, and run software across various environments. Containers, often managed by orchestration tools, offer flexibility and scalability in alignment with application modernization initiatives.

Application modernization involves updating legacy applications to leverage modern technologies, architectures, and methodologies. This transition often includes breaking monolithic applications into microservices enabling greater ability and scalability. Containerization is a part of modernization that allows organizations to transform legacy systems into adaptable, cloud-native solutions.

Cloud computing provides the scalable infrastructure and services required to host containerized applications efficiently. Public cloud platforms offer managed container orchestration which simplifies the deployment and scaling of containerized applications. Cloud environments enable organizations to adapt to changing demands rapidly and cost-effectively, making them a natural fit for modernized applications.

Cloud applications provide many advantages, but they also encounter issues concerning data security and availability. The modern information technology landscape is dynamic. Where businesses are shifting from on premises to cloud, the backup and restoration of applications plays a crucial role. Within this dynamic environment, preventing data loss becomes critical because cloud applications house significant volumes of vital data that can be vulnerable to accidental deletions, system failures, or cyberattacks. Service disruptions, a common risk in cloud computing, emphasize the importance of backup and restore procedures to ensure swift recovery to minimize downtime. Moreover, stringent data retention and compliance requirements span various industries, necessitating robust strategies that guarantee regulatory compliance and the accessibility of historical data. In the event of security incidents, such as data breaches or ransomware attacks, these mechanisms serve as a lifeline, restoring systems to a secure state and mitigating the impact. Consequently, disaster recovery planning is essential, particularly for cloud applications which frequently rely on backup and restore processes to revive services and data after catastrophic events; disaster recovery planning thus safeguards business continuity.

In container technology, there are two main kinds of volumes: ephemeral and persistent volumes. Ephemeral volumes are deleted when a pod restarts whereas persistent volumes retain data when a pod restarts. This data retention capability of an application decides whether the application is stateless or stateful. Stateful applications are good candidates for backup and restore of user data. In contrast, persistent data is not key for stateless applications; therefore, backup and restore is not usually required for persistent data as long as a manifest for achieving the state of the application is preserved.

Container-native application backups consist generally of two sets of data that are protected: the stateful data and the resource data. Stateful data refers to the data that represents the state of an application and persists across sessions. The stateful data resides on a storage device or a Physical Volume ("PV") that is accessed by the application via a Physical VolumeClaim ("PVC"). In containerized applications, stateful data includes databases, persistent volumes, configuration files, and logs. Resource data is information used by the application for various operations, such as secrets, routes, services, pods, etc. Resource data is crucial for redeploying or recreating an application in its intended environment. It ensures that the application can be consistently and reliably managed and orchestrated.

As used herein, the term "imperative," when referring to applications, signifies applications that are not declarative or have components that are not declarative. Imperative applications include common applications such as data management products, database servers, relational database management systems, servers, document-oriented database programs, document-oriented databases, and other common applications that were initially developed in non-containerized environments.

As used herein, the term "imperative," when referring to platforms and services, signifies platforms and services which are built upon these imperative applications, such as containerized software solutions, analytics platforms, artificial intelligence (AI) data preparation programs, AI development and deployment programs, platform and operations management programs, operations management and automation software, integration software platforms, and other polyglot applications.

When considering imperative applications, a problem with conventional data protection methods is that available tools focus solely on movement of data from a containerized environment to a data storage target and fail to provide guidance on how to create a data plan to protect an application that might have special considerations within a subset of resources that need to be protected or in any ordering that is needed to recover an application successfully.

As used herein, the term "restore" refers to an act of moving data from backup storage to a production cluster. This is differentiated from "recovery," which, as used herein, refers to putting an application back into a working state after data has been restored to a cluster.

With imperative applications, e.g., data management products or database management systems, it is not sufficient to simply restore data to a containerized system from backup storage and expect that the application can be recovered. Care must be taken to restore certain artifacts in a prescribed order so that the application can be recovered properly.

A user may be confronted with an imperative application that does not already have a published recipe. Alternatively, a user may have an application platform that consists of several different individual applications that may or may not have a published recipe(s). Consequently, there is a problem where users have imperative applications that do not have known workflow artifacts: users have to go through an arduous process of trying to create a backup and restore workflow to have a successful recovery. This problem is exacerbated when users do not have deep knowledge about the application.

In relation to data protection plan creation, embodiments of the present disclosure produce a solution to one or more of these problems. These embodiments may solve such problems by identifying a new imperative application where recovery workflow for a new imperative application is unavailable, analyzing the new imperative application to determine resources required to be protected, and determining an order of steps to be performed within a workflow to guarantee recovery of the new imperative application. These embodiments may also include utilizing a subset of legacy recovery plans to create at least in part a preliminary recovery plan for the new imperative application, testing the preliminary recovery plan and, upon failure of the preliminary recovery plan, iteratively updating the preliminary recovery plan until a failure-free recovery plan is developed for the new imperative application According to an embodiment, a system may include a processor that executes computer executable components stored in memory. The computer executable components may comprise an application identification component that identifies a new imperative application where recovery workflow for the new imperative application is unavailable. The computer executable components may also comprise an analysis component that analyzes the new imperative application to determine resources required to be protected, and the analysis component may determine an order of steps to be performed within a workflow to guarantee recovery of the new imperative application. The computer executable components may further comprise a recovery design component that utilizes a subset of legacy recovery plans to create a failure-free recovery plan.

In some embodiments, the recovery design component utilizes the subset of legacy recovery plans to create a preliminary recovery plan for the new imperative application. According to an embodiment, the recovery design component tests the preliminary recovery plan and iteratively updates the preliminary recovery plan until the failure-free recovery plan is developed.

In some embodiments of the system, in response to determining that existing workflows cannot restore the new imperative application to a desired recovery state, the recovery design component may create and validate a new workflow that restores the new imperative application to the desired recovery state.

In some embodiments of the system, when the failure-free recovery plan is designed, the recovery design component adds the failure-free recovery plan and failures of the preliminary recovery plan to the system to facilitate analysis and application for generation of failure-free recovery plan (s) to other new imperative applications. According to an embodiment, the recovery design component builds a generative artificial intelligence model to facilitate recovery plan design.

In some embodiments of the system, the recovery deign component iteratively adjusts backups and workflows to optimize resource utilization by the failure-free recovery plan. According to an embodiment, the recovery design component modifies the new workflow to skip backup of unnecessary resources. In some embodiments of the system, a failure free recovery plan restores resources of the new imperative application in a prescribed order.

According to an embodiment, the recovery design component creates the failure-free recovery plan across a plurality of namespaces. In some embodiments of the system, if data is missing or incorrect after recovery of a resource, the recovery design component modifies workflow of the failure-free recovery plan so that the data is restored at a later point in the workflow. In some embodiments of the system, the failure-free recovery plan identifies resources to be restored and checks for availability of the resources prior to restoring additional resources.

Advantages of this system may include reducing time and effort requirements in developing data protection workflows because past experience informs the development of a new workflow for a new application. Advantages of this system may further include a greater likelihood of successful recovery of an imperative application, a reduction of the knowledge required for successful recovery of the application, and greater optimization of backups where certain resources are not required during the restore process.

According to some embodiments, the above-described computer system may be implemented as a computer-implemented method or as a computer program product.

Some embodiments of the present disclosure are now described with reference to the drawings. In the drawings, like referenced numerals are used to refer to like elements throughout. In the following description, for purposes of explanation, numerous specific details are set forth in order to provide a more thorough understanding of the embodiments. In various cases, some embodiments may be practiced without these specific details, yet a person having ordinary skill in the art will recognize that such embodiments are within metes and bounds of this disclosure.

FIG. 1 illustrates an example system 100 for facilitating recovery plan design. The system 100 uses an application identification component, an analysis component, and a recovery design component. The identification component identifies a new imperative application where recovery workflow for the new imperative application is unavailable. The analysis component analyzes the new imperative application to determine resources required to be protected to guarantee recovery of the new imperative application. The analysis component further determines an order of steps to be performed within a workflow to guarantee recovery of the new imperative application. The recovery design component utilizes a subset of legacy recovery plans to create, at least in part, a preliminary recovery plan for the new imperative application; the recovery design component also tests the preliminary recovery plan and, upon failure of the preliminary recovery plan, iteratively updates the preliminary recovery plan until a failure-free recovery plan is developed for the new imperative application.

Aspects of systems (e.g., systems 100, 200, and the like), apparatuses, or processes in various embodiments of the present disclosure can constitute one or more machine-executable components embodied within one or more machines. For example, the components may be embodied in one or more computer readable mediums (or media) associated with one or more machines. Such components, when executed by the one or more machines (e.g., computers, computing devices, virtual machines, etc.) can cause the machines to perform the operations described. System 100 may comprise an application identification component 102, a memory 104, an analysis component 106, a processor 108, a recovery design component 110, and a system bus 112.

The system 100 and/or the components of the system 100 may use hardware and/or software to solve problems that are highly technical in nature. The system 100 solves problems that are not abstract and that cannot be performed as a set of mental acts by a human. Further, some of the processes may be performed by specialized computers for carrying out defined tasks related to recovery plan development. The system 100 and/or components of the system 100 may be employed to solve new problems that arise through advancements in technologies. The system 100 may provide technical improvements to recovery plan development by reducing time and effort requirements in developing data protection workflows.

The system 100 may include a processor 108. In some embodiments, the processor 108 may execute a component or subcomponent associated with the system 100. Components or subcomponents associated with the system 100 may include one or more machine readable, writable, and/or executable instructions. In some embodiments, the system 100 may include a memory 104, and the memory 104 may store one or more components and/or subcomponents associated with the system 100. In some embodiments, the processor 108 may execute a component stored in the memory 104.

In some embodiments, the system 100 may include a computer-readable memory 104 that may be operably connected to the processor 108. The memory 104 may store computer-executable instructions that, upon execution by the processor 108, may cause the processor 108 and/or one or more other components of the system 100 (e.g., the application identification component 102, the analysis component 116, and/or the recovery design component 110) to perform one or more actions. In some embodiments, the memory 104 may store computer-executable components (e.g., the application identification component 102, the analysis component 116, and/or the recovery design component 110).

The system 100 and/or a component thereof as described herein may be communicatively, electrically, operatively, optically, and/or otherwise coupled to one another via a bus 112. The bus 112 may include one or more of a memory bus, memory controller, peripheral bus, external bus, local bus, and/or another type of bus that may employ one or more bus architectures. In some embodiments, the system 100 may be coupled (e.g., communicatively, electrically, operatively, optically, and/or the like) to one or more external systems (e.g., an electrical output production system, one or more output targets, an output target controller, and/or the like). In some embodiments, the system 100 may be coupled to one or more external sources, and/or devices (e.g., classical computing devices, communication devices, and/or like devices), such as via a network. In some embodiments, one or more of the components of the system 100 may reside in the cloud and/or locally in a local computing environment (e.g., at one or more specified locations).

In addition to the processor 108 and/or the memory 104 described above, the system 100 may include one or more computer and/or machine readable, writable, and/or executable components and/or instructions. When executed by the processor 108, these components and/or instructions may enable performance of one or more operations defined by the component(s) and/or instruction(s).

In various embodiments, the application identification component 102 identifies an application. According to some embodiments, the application identification component 102 identifies whether the application is a container-native application. In some embodiments, the application identification component 102 identifies whether the application is a new imperative application. In some embodiments, the application identification component 102 identifies whether the application is a known application. According to some embodiments, the application identification component 102 identifies whether recovery workflow is available for the application. According to some embodiments, the application identification component 102 identifies whether or not recovery workflow is available for the application. In some embodiments, the application identification component 102 identifies a new imperative application wherein recovery workflow is unavailable.

According to some embodiments, the analysis component 106 analyzes a new imperative application and analyzes the application to determine resources required to be protected. The analysis component 106 determines the resources required to be protected for recovery of the application and the orders of execution to be performed within a workflow. The analysis component 106 may facilitate efficient recovery of the new imperative application. In various embodiments, the analysis component 106 defines which of the application resources are critical to protect. In some embodiments, the analysis component 106 identifies a specific ordering of steps within a workflow that needs to be performed to guarantee that the application can be properly recovered.

In various embodiments, the recovery design component 110 may utilize a subset of legacy recovery plans to create a preliminary recovery plan such as to create the preliminary recovery plan for a new imperative application. The recovery design component 110 may test the preliminary recovery plan. Upon failure of the preliminary recovery plan, the recovery design component 110 may iteratively update the recovery plan. In various embodiments, the recovery design component 110 iteratively updates the recovery plan until a failure-free recovery plan is developed.

In some embodiments, in response to determining that existing workflows cannot restore the new imperative application to a desired recovery state, the recovery design component 110 creates and validates a new workflow that restores the new imperative application to the desired recovery state. When the failure-free recovery plan is designed, the recovery design component 110 adds the failure-free recovery plan and the failures of the preliminary recovery plan to a database of known patterns to facilitate analysis and other new imperative applications.

In various embodiments, the recovery design component 110 builds a generative AI model to facilitate recovery plan design.

In various embodiments, the recovery deign component 110 iteratively adjusts backups and workflows to optimize resource utilization by the failure-free recovery plan.

In some embodiments, the recovery design component 110 modifies a new workflow to skip backup of unnecessary resources.

In some embodiments, the failure free recovery plan restores resources of the new imperative application in a prescribed order.

In various embodiments, the recovery design component 110 creates the failure-free recovery plan across a plurality of namespaces.

In various embodiments, if data is missing or incorrect after recovery of a resource, the recovery design component 110 modifies the workflow of the failure-free recovery plan so that the data is restored at a later point in the workflow.

In some embodiments, the failure-free recovery plan identifies resources to be restored and checks for availability of the resources prior to restoring additional resources.

Figure 2:
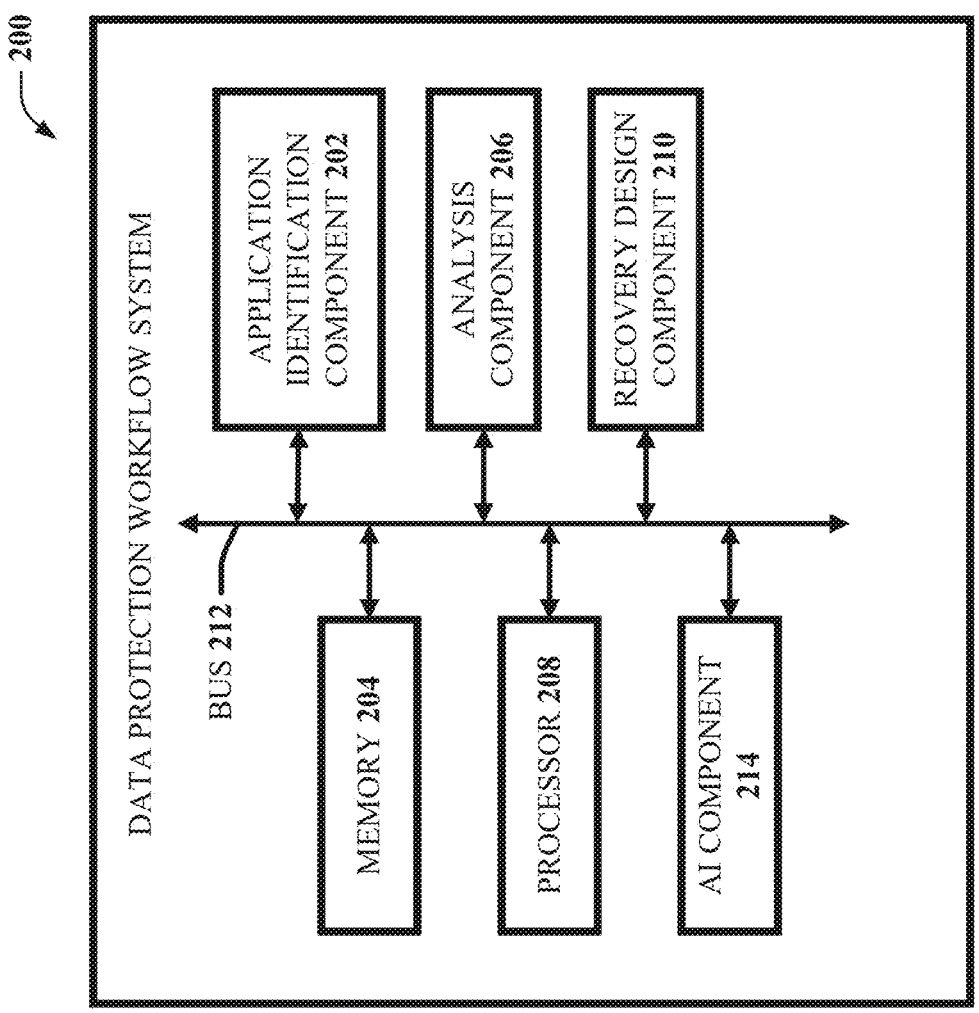

FIG. 2 illustrates an example system 200 that can facilitate recovery plan design. The system 200 uses an application identification component 202, an analysis component 206, a recovery design component 210, and an AI component 214 that trains at least one artificial intelligence model. The system 200 may also include a memory 204, a processor 208, and a system bus 212. Description of like components has been omitted for the sake of brevity.

In various embodiments, the AI component 214 trains at least one AI model. In some embodiments, the AI component 214 trains the AI model to help inform creation of future workflows. In same embodiments, the AI component 214 applies previously learned patterns pertaining to application recovery. In various embodiments, the AI component 214 applies multiple patterns concurrently. In various embodiments, the AI component 214 updates at least one database with patterns learned and errors observed. In some embodiments, the AI component 214 records patterns learned and errors observed in at least one database. In some embodiments, AI component 214 learns at least one new pattern and observes at least one new error. In some embodiments, the AI component 214 develops a set of rule-based probabilities based upon patterns learned and errors observed.

The systems and/or devices are described herein with respect to interaction between one or more components. Such systems and/or components may include the components and/or sub-components specified therein, one or more of the specified components and/or sub-components, and/or additional components. Sub-components may be implemented as components communicatively coupled to other components rather than included within parent components. One or more components and/or sub-components may be combined into a single component providing aggregate functionality. The components may interact with one or more other components not specifically described herein for the sake of brevity but known by those of skill in the art.

Figure 3:
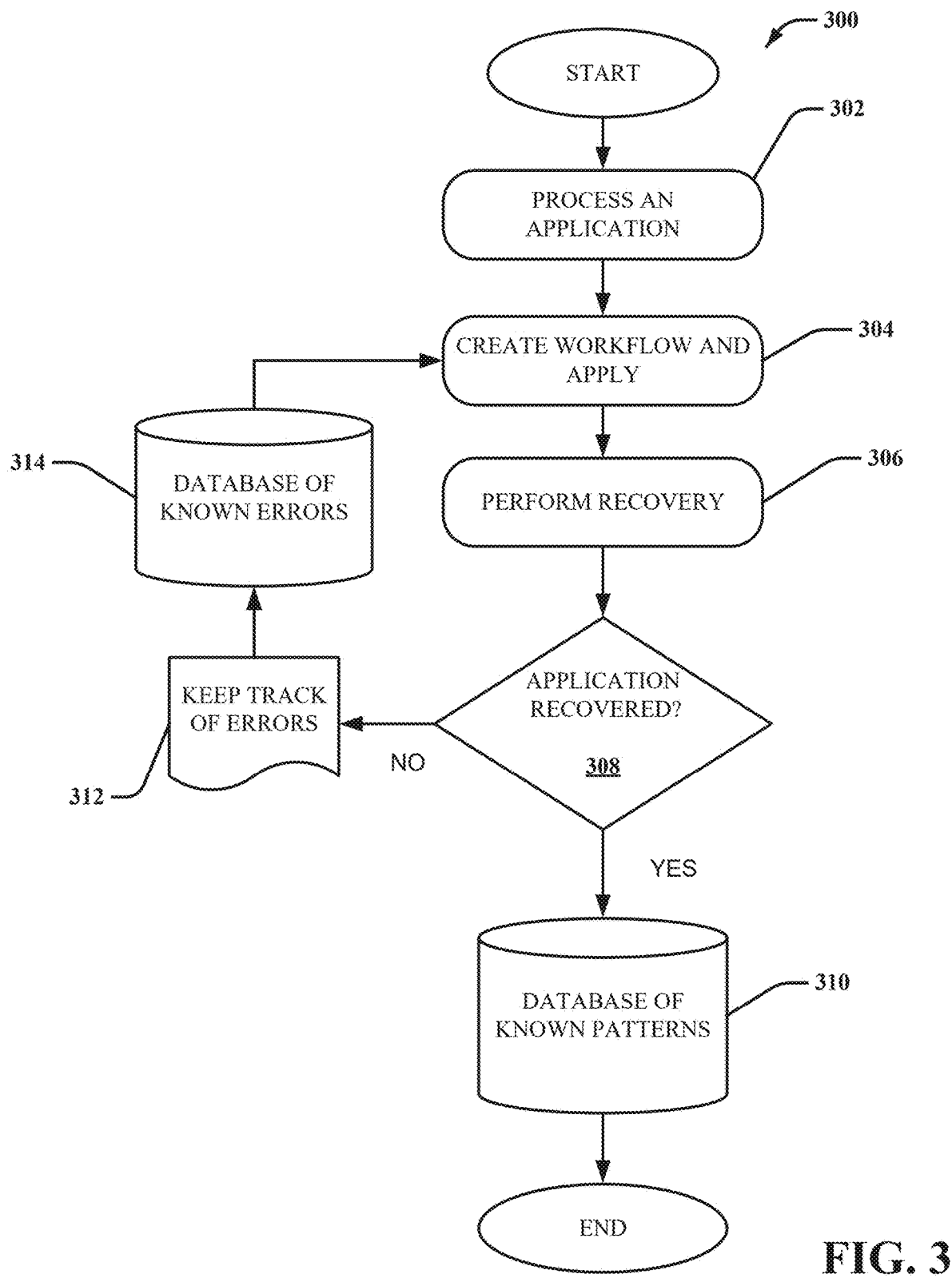
FIGS. 3 and 4 illustrate example recovery flow diagrams in accordance with some embodiments described herein.

FIG. 3 illustrates an example recovery flow diagram 300 that can facilitate creation of a failure-free recovery plan. In some embodiments, the application is scanned either from the cluster or operator deployment perspective to identify potential resources for restoration. In various embodiments, the application undergoes processing for recovery by applying previously learned patterns. In some embodiments, multiple patterns can be applied concurrently by inspecting resources of the application. In various embodiments, the database 310 stores errors, patterns, a list of applications, and the respective success rate of the applications. In some embodiments, any newly learned patterns are put back into the database 310.

The recovery flow diagram 300 starts by processing 302 an application. The recovery flow diagram 300 continues by creating and applying 304 a workflow. The recovery flow diagram 300 continues by performing 306 a recovery of the application. The recovery flow diagram 300 then continues by determining 308 whether the application was properly recovered.

If the application was not properly recovered, the recovery flow diagram 300 continues by keeping track of errors 312, which are then added to the database of known errors 314. The recovery flow diagram 300 then continues the process by returning to creating and applying 304 a workflow.

If the application was properly recovered at 308, the recovery flow diagram adds the results to the database of known patterns 310, and the recovery flow diagram 300 then ends.

Figure 4:
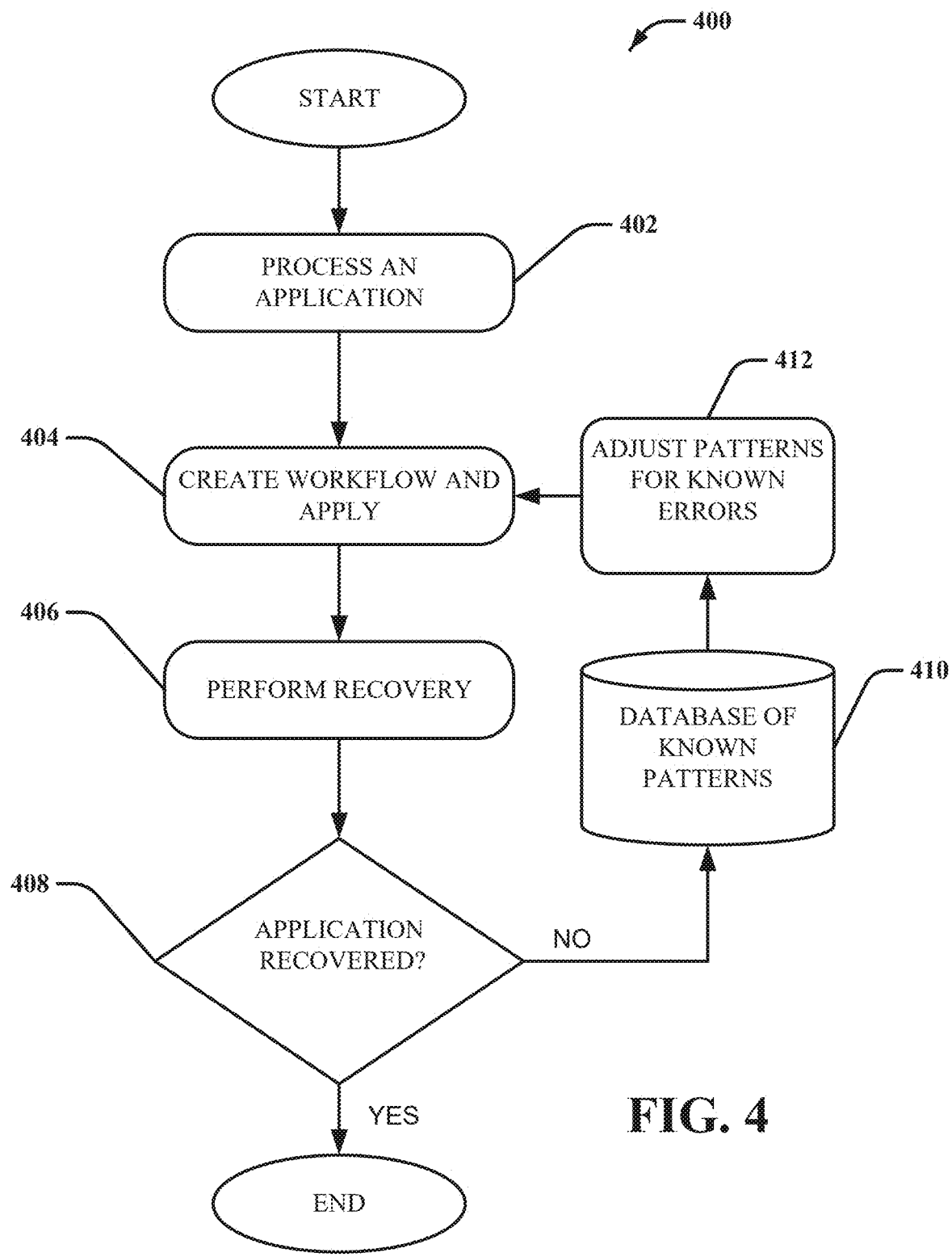

FIG. 4 illustrates an example recovery flow diagram 400 that can facilitate creation of a failure-free recovery plan. In some embodiments, the application is scanned either from the cluster or operator deployment perspective to identify potential resources for restoration. In various embodiments, the application undergoes processing 402 for recovery by applying previously learned patterns. In some embodiments, multiple patterns can be applied concurrently by inspecting resources of the application. In various embodiments, database 410 stores errors, patterns, a list of applications, and their respective success rate. In some embodiments, any newly learned patterns are put back into the database 410. The recovery flow diagram 400 starts by processing 402 an application. The recovery flow diagram 400 continues by creating and applying 404 a workflow. The recovery flow diagram 400 then continues by performing 406 a recovery. The recovery flow diagram 400 then continues by determining 408 whether the application was properly recovered.

If the application was determined to be properly recovered at 408, the recovery flow diagram 400 then ends.

If the application was determined to have not been properly recovered at 408, the recovery flow diagram 400 then continues by keeping track of errors 410, which are then used to adjust 412 patterns for known errors. The recovery flow diagram 400 then continues the process by returning to creating and applying 404 a workflow.

In various embodiments, application recovery using this process is iterative in nature. In some embodiments, iterative in nature means that data is collected during the application recovery process, stored in the database of known errors 410, and then used to adjust 412 patterns for known errors. These adjustments may then be used for creating and applying 404 the workflow.

In some embodiments, a knowledge base of previous patterns significantly reduces the iteration count for an application by avoiding the implementation of workflows known to be unsuccessful at recovering an application or known to have a high likelihood of being unsuccessful at recovering an application. In various embodiments, the database of known patterns includes a success probability for a pattern based on previous application recoveries. In some embodiments, a newly added pattern will initially have a 100% probability of success because it results in successful recovery of an application. In various embodiments, this probability value may decrease if the pattern applied to an application does not lead to successful recovery despite having similar resources. In some embodiments, the resulting probability is considered for future applications.

Figure 5:
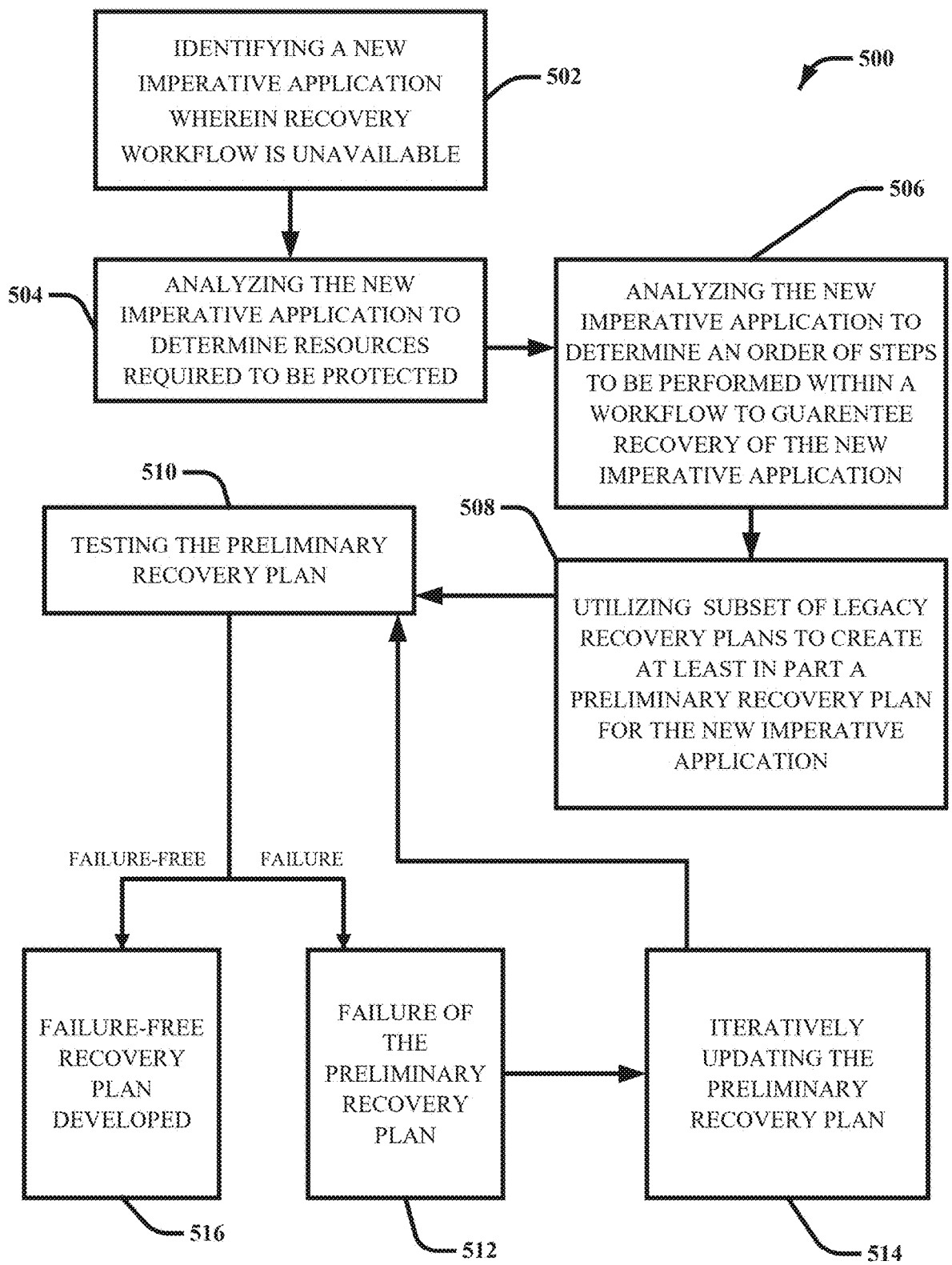
FIG. 5 illustrates a flow diagram of an example computer implemented method that facilitates automated creation of data protection workflow for containerized applications in accordance with some embodiments described herein.

Next, FIG. 5 illustrates a flow diagram of a method 500 that can facilitate creation of a failure-free recovery plan in accordance with some embodiments described herein such as the system 200 of FIG. 2 and the system 100 of FIG. 1. While the method 500 is described relative to the system 200 of FIG. 2, the method 500 can be applicable also to other systems described herein. Repetitive description of like elements and/or processes employed in respective embodiments is omitted for sake of brevity.

At 502, the method 500 includes identifying a new imperative application wherein recovery workflow is unavailable. The method 500 may use a system operatively coupled to the processor (e.g., application identification component 210) to identify the new imperative application.

At 504, the method 500 includes analyzing the new imperative application to determine resources required to be protected.

At 506, the method 500 includes analyzing the new imperative application to determine an order of steps to be performed within a workflow to guarantee recovery of the new imperative application.

At 508, the method 500 includes utilizing a subset of legacy recovery plans to create, at least in part, a preliminary recovery plan for the new imperative application.

At 510, the method 500 includes testing the preliminary recovery plan. A system (e.g., recovery design component 210 or A.I. component 212) may perform the testing.

At 512, the method includes recognizing a failure of the preliminary recovery plan. A system (e.g., recovery design component 210 or A.I. component 212) may recognize the failure of the preliminary recovery plan.

At 514, the method 500 includes iteratively updating the preliminary recovery plan. A system (e.g., recovery design component 210 or A.I. component 212) may perform the iterative update.

At 516, the method 500 includes generating a failure-free recovery plan. A system (e.g., recovery design component 210 or A.I. component 212) may generate the failure free recovery plan.

In some embodiments, the method 500 is performed by a system such as system 100 of FIG. 1 or system 200 of FIG. 2. The analysis of operations 504 and 506 may be performed by an analysis component (e.g., analysis component 206 of FIG. 2). The utilizing the subset of legacy recovery plans of operation 508 may be performed by a recovery design component (e.g., recovery design component 210). The testing the preliminary recovery plan of operation 510 may be performed by a recovery design component (e.g., recovery design component 210) or an artificial intelligence component (e.g., A.I. component 212). The recognizing a failure of the preliminary recovery plan of operation 512 may be performed by a recovery design component (e.g., recovery design component 210) or an artificial intelligence component (e.g., A.I. component 212). The iteratively updating the preliminary recovery plan of operation 514 may be performed by a recovery design component (e.g., recovery design component 210) or an artificial intelligence component (e.g., A.I. component 212). The generating a failure-free recovery plan of operation 516 may be performed by a recovery design component (e.g., recovery design component 210) or an artificial intelligence component (e.g., A.I. component 212).

Figure 6:
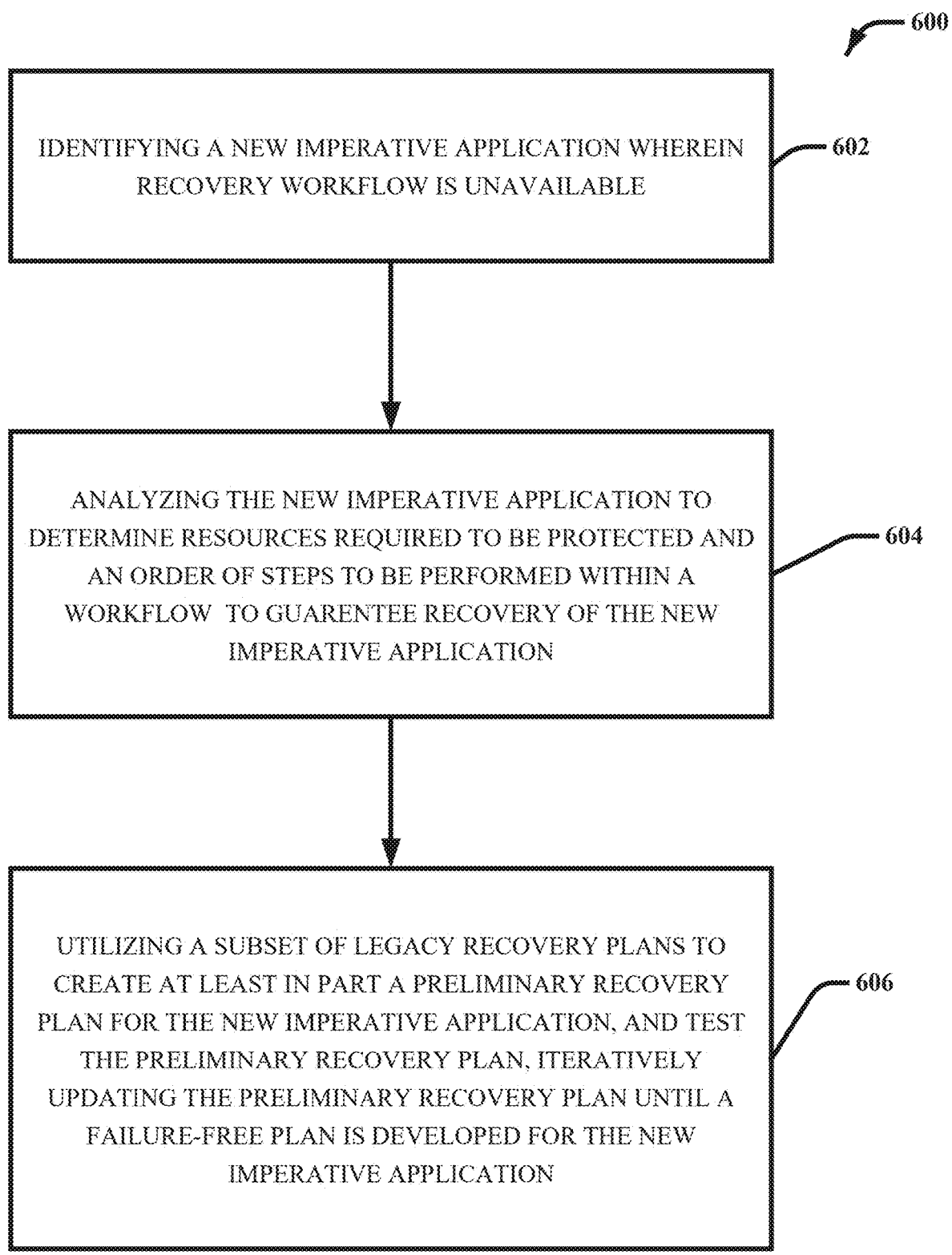
FIG. 6 illustrates a flow diagram of an example computer program product that facilitates automated creation of data protection workflow for containerized applications in accordance with some embodiments described herein.

Next, FIG. 6 illustrates a flow diagram of a method 600 that can facilitate creation of a failure free recovery plan in accordance with some embodiments described herein. While the method 600 is described relative to the system 200 of FIG. 2, the method 600 can be applicable also to other systems described herein such as the system 100 of FIG. 1.

For simplicity of explanation, the computer-implemented methods provided herein are depicted and/or described as a series of actions. It is to be understood that the subject matter is not limited by the actions illustrated and/or by the order thereof. For example, actions can occur in one or more orders, concurrently, and/or with other acts not presented and described herein. Furthermore, not all illustrated actions can be utilized to implement the computer-implemented methods in accordance with the described subject matter. In addition, the computer-implemented methods could alternatively be represented as a series of interrelated states via a state diagram or events. Additionally, the computer-implemented methods described in this specification are capable of being stored on an article of manufacture to facilitate transporting and transferring the computer-implemented methods to computers. The term article of manufacture, as used herein, encompasses a computer program accessible from any computer-readable device or storage media.

At 602, the method 600 includes identifying a new imperative application wherein recovery workflow is unavailable. A system operatively coupled to the processor (e.g., application identification component 210) may perform the identifying.

At 604, the method 600 includes analyzing the new imperative application to determine the resources required to be protected. Also at 604, the method 600 includes determining an order of steps within a workflow to guarantee recovery of the new imperative application. A system (e.g., analysis component 206) may perform the analysis of the method 600.

At 606, the method 600 includes utilizing a subset of legacy recovery plans to create, at least in part, a preliminary recovery plan for the new imperative application. Also at 606, the method 600 includes testing and iteratively updating the preliminary recovery plan until a failure-free plan is developed for the new imperative application. A system (e.g., recovery design component 210 or A.I. component 212) may perform the utilization, creation, testing, and/or iterative updating of the method 600.

One or more systems, devices, computer program products, and/or computer-implemented methods provided herein relate to creation of failure-free recovery plans. A system may include a processor that executes computer executable components stored in memory. The computer executable components may include an application identification component that identifies a new imperative application where recovery workflow for the new imperative application is unavailable. The computer executable components may include an analysis component that analyzes the new imperative application to determine resources required to be protected and determining an order of steps to be performed within a workflow to guarantee recovery of the new imperative application. The computer executable components may include a recovery design component that utilizes a subset of legacy recovery plans to create, at least in part, a preliminary recovery plan for the new imperative application and test the preliminary recovery plan; upon failure of the preliminary recovery plan, the recovery design component may iteratively update the preliminary recovery plan until a failure-free recovery plan is developed for the new imperative application.

Advantages of this system include reducing time and effort requirements in developing data protection workflows, because past experience informs the development of a new workflow for a new application. Advantages of this system further include a greater likelihood of a successful recovery of an imperative application, due to the nature of imperative applications. Advantages of this system further include reducing the need for deep knowledge of an application because the herein disclosed comparison of the new application to previous plans. Advantages of this system further include optimizing backups where it is well known that certain resources will be skipped/not needed during restore process.

In some embodiments of the aforementioned system, in response to determining that existing workflows cannot restore the new imperative application to a desired recovery state, the recovery design component creates and validates a new workflow that restores the new imperative application to the desired recovery state.

In some embodiments of the aforementioned system, when the failure-free recovery plan is designed, the recovery design component adds the failure-free recovery plan and the failures of the preliminary recovery plan a database of known patterns to facilitate analysis and other new imperative applications.

In some embodiments of the aforementioned system, the recovery design component builds a generative artificial intelligence model to facilitate recovery plan design. In some embodiments of the aforementioned system, the recovery deign component iteratively adjusts backups and workflows to optimize resource utilization by the failure-free recovery plan. In some embodiments of the aforementioned system, the recovery design component modifies the new workflow to skip backup of unnecessary resources.

In some embodiments of the aforementioned system, the failure free recovery plan restores resources of the new imperative application in a prescribed order.

In some embodiments of the aforementioned system, the recovery design component creates the failure-free recovery plan across a plurality of namespaces.

In some embodiments of the aforementioned system, if data is missing or incorrect after recovery of a resource, the recovery design component modifies workflow of the failure-free recovery plan so that the data is restored at a later point in the workflow.

In some embodiments of the aforementioned system, the failure-free recovery plan identifies resources to be restored and checks for availability of the resources prior to restoring additional resources.

FIGS. 7-13 illustrate example schema for carrying out various limitations of various embodiments described herein. There are three defined schemas for the database referenced in FIGS. 7-13:

Schema0: SN | Pattern (records patterns learnt)
Schema1: Error/Behaviour | Pattern | Success rate | List of applications pattern applied on
Schema2: Application name | Successfully applied patterns (leading to successful recovery).

In addition, several patterns ("P") found during experimentation: (shown below) are referenced throughout FIGS. 7-13.

P1. Backup and restore all application resources, leading to successful recovery of the application (default pattern).
P2. Always restore stateful data as the first step of recovery workflow.
P3. Skip conflicting/incorrect state application resources or their parent resources during the recovery. Modify the workflow to further skip unnecessary resources during backup.
P4. Restore single copy of stateful data when there are multiple, redundant copies (replica set). Modify the workflow to further identify and only backup a single copy of stateful data from the replica set.
P5. Restore application resources in an order of their deployment. For example, recover operator resources before any application instance recovery.
P6. Always skip unnecessary resources such as events during recovery. Modify the workflow to not backup unnecessary resources.
P7. Restore only application resources in a prescribed order.
P8. If data is missing or incorrect after recovery of a resource, modify workflow so that the data is restored at a later point in the workflow. This is for situations that the data is restored too early in the process and is modified by the container resources to an undesired state.
P9. Skip recovery of stateful data if the data is not necessary for recovery of the application. Modify the workflow to further skip backup of stateful data that is not necessary for the recovery of the application.
P10. Identify resources to be restored and check for their availability prior to restoring additional resources.

FIG. 7 illustrates an example schema in accordance with some of the embodiments described herein. Initially, only one pattern P1 (the default pattern), is present in Schema0, which backs up all application resources and stateful data. When this pattern was applied to a new application "Relational DB1", the backup completed successfully, but the recovery failed. Upon investigation, it was found that there were duplicate Persistent Volume Claims (PVCs) in the recovered namespace. The issue arose because, during the recovery process, the operator could not locate the PVCs (stateful data from the backup) and proceeded to create new PVCs. Essentially, the application operator reconciled the application before the PVCs were restored. The errors encountered were recorded in Schema1, and a new pattern was created if it did not already exist, or an existing pattern from Schema0 was selected and applied. Following this process, a new pattern P2, was created, and entries were made in both Schema0 and Schema1. When this new pattern was applied to the application, the recovery was successful, and a new entry was added to Schema2, showing the list of patterns used for successful application recovery. Note that for simplicity, with respect to FIG. 7, Schema0 is not shown on each iteration. It holds all patterns learnt so far.

FIG. 8 illustrates an example schema in accordance with some of the embodiments described herein. More particularly, the figure illustrates a relational database application. The same previous patterns with respect to FIG. 7 were applied for backup and recovery, resulting in a successful recovery of the application, except that, post-recovery, the user interface (UI) displayed a "Catalog Source not found" error. This error was recorded in Schema1, and a new pattern P3 was created. This new pattern allows certain resources to be skipped during recovery. For this application, the ClusterService Version (CSV) was skipped during backup, which led to a successful recovery in the next iteration. Skipping the CSVs helps in creating resources specific to the target namespace during recovery. Finally, an entry was made in Schema2, listing the patterns applied for the application's recovery.

FIG. 9 illustrates an example schema in accordance with some of the embodiments described herein. More particularly, for this non-relational database application, dump and restore techniques are adopted. It is not advisable to dump all the PVC data from the replica set, so only one copy of the data is backed up and restored. A new pattern P4, has been introduced for this purpose. To recover the application, patterns P2, P3, and P4 are taken into consideration. Upon successful application recovery, it is recorded in Schema2.

FIG. 10 illustrates an example schema in accordance with some of the embodiments described herein. More particularly, the non-relational database application has a simple deployment and does not use an Operator Lifecycle Manager (OLM) based installation, so applying pattern P3 is unnecessary. Two new patterns, P5 and P6, were introduced. The need for P5 was first recognized when the instance was being restored earlier in the sequence, before the operator was ready. P6 was derived from log analysis. By applying patterns P2, P5, and P6, the non-relational database application was successfully recovered and recorded in Schema2.

FIG. 11 illustrates an example schema in accordance with some of the embodiments described herein. More particularly, the relational database utilizes previously learned patterns and does not introduce any new ones. The patterns applied are P2, P3, P4 and P6. Upon successful recovery, a new entry is made in Schema2.

FIG. 12 illustrates an example schema in accordance with some of the embodiments described herein. More particularly, the non-relational database utilizes previously learned patterns and does not introduce any new ones. It is somewhat unique in that it skips application-specific resources. By applying patterns P2, P3, P5 and P6, it was successfully recovered, and an entry was made in Schema2.

FIG. 13 illustrates an example schema in accordance with some of the embodiments described herein. More particularly, the application consists of multiple relational and non-relational/NoSQL databases, making it highly complex and requiring extra care. It utilizes existing patterns P2, P5, and P6, while introducing new patterns P7, P8, and P9 based on the errors encountered. Pattern P7 addresses the issue where key resources are recovered before the operator. P8 allows additional patching after the restoration of a resource.

P9 is designed to skip unimportant PVCs from being backed up, as they do not hold key data. By applying patterns P2, P5, P6, P7, P8, and P9, the complex application with multiple relational and non-relational (NoSQL) databases was successfully recovered. Finally, an entry was made in Schema2.

Figure 14:
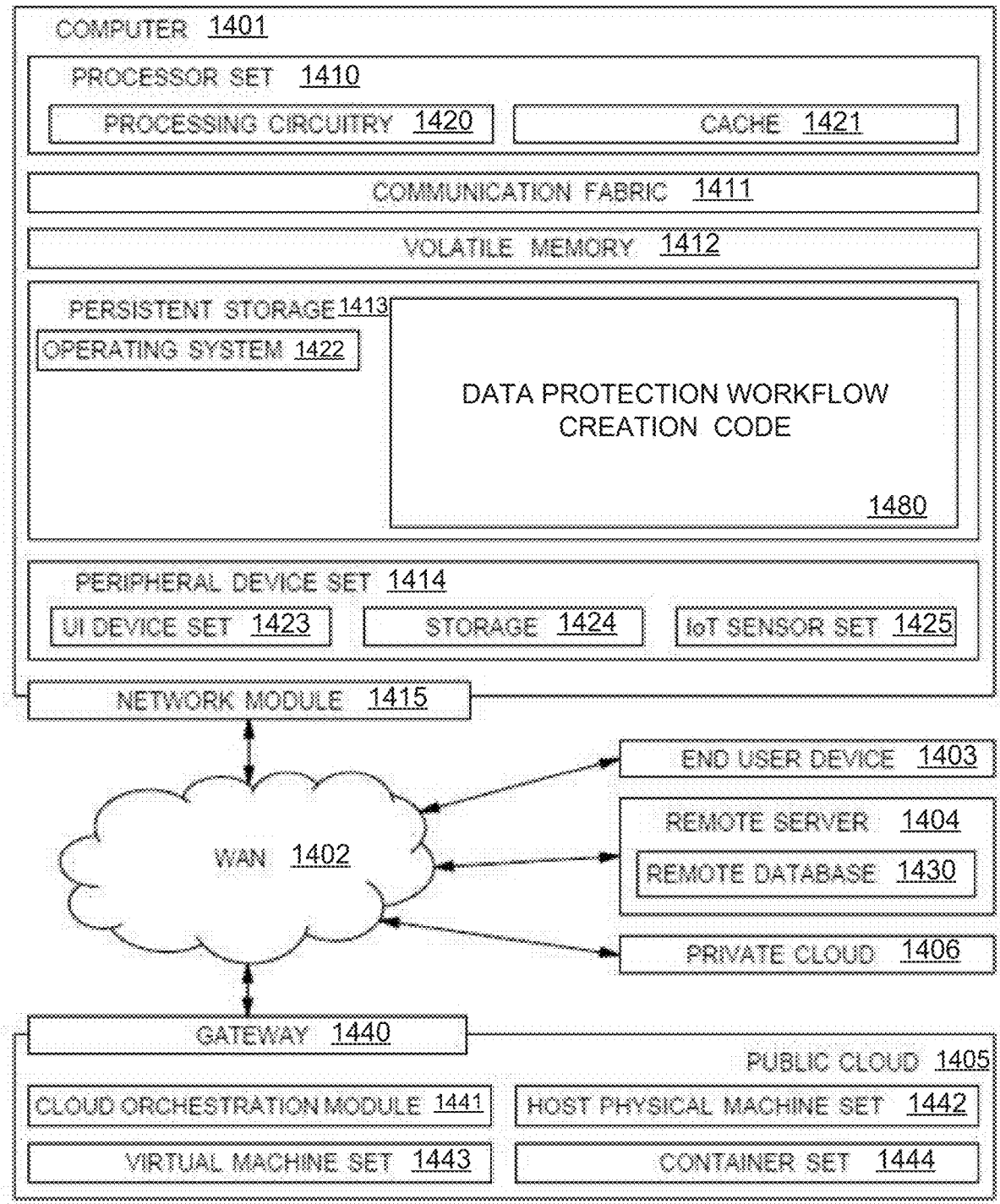
FIG. 14 illustrates a block diagram of an example computing environment in which some embodiments described herein can be facilitated.

FIG. 14 and the following discussion are intended to provide a brief, general description of a suitable computing environment 1400 in which some embodiments described herein can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1400 contains an example of an environment for the execution of at least some of the computer code involved in performing the inventive methods, such as iteratively updating the preliminary recovery plan until a failure-free recovery plan is developed with data protection workflow creation code 1480. In addition to block 1480, computing environment 1400 includes, for example, computer 1401, wide area network (WAN) 1402, end user device (EUD) 1403, remote server 1404, public cloud 1405, and private cloud 1406. In this embodiment, computer 1401 includes processor set 1414 (including processing circuitry 1420 and cache 1421), communication fabric 1411, volatile memory 1412, persistent storage 1413 (including operating system 1422 and block 1445, as identified above), peripheral device set 1414 (including user interface (UI), device set 1423, storage 1424, and Internet of Things (IoT) sensor set 1425), and network module 1415. Remote server 1404 includes remote database 1430. Public cloud 1405 includes gateway 1440, cloud orchestration module 1441, host physical machine set 1442, virtual machine set 1443, and container set 1444.

COMPUTER 1401 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1430. As is well understood in the art of computer technology, and depending upon the technology, performance of a computer-implemented method can be distributed among multiple computers and/or between multiple locations. On the other hand, in this presentation of computing environment 1400, detailed discussion is focused on a single computer, specifically computer 1401, to keep the presentation as simple as possible. Computer 1401 can be located in a cloud, even though it is not shown in a cloud in FIG. 14. On the other hand, computer 1401 is not required to be in a cloud except to any extent as can be affirmatively indicated.

PROCESSOR SET 1410 includes one, or more, computer processors of any type now known or to be developed in the future. Processing circuitry 1420 can be distributed over multiple packages, for example, multiple, coordinated integrated circuit chips. Processing circuitry 1420 can implement multiple processor threads and/or multiple processor cores. Cache 1421 is memory that is located in the processor chip package(s) and is typically used for data or code that should be available for rapid access by the threads or cores running on processor set 1410. Cache memories are typically organized into multiple levels depending upon relative proximity to the processing circuitry. Alternatively, some, or all, of the cache for the processor set can be located "off chip." In some computing environments, processor set 1410 can be designed for working with qubits and performing quantum computing.

Computer readable program instructions are typically loaded onto computer 1401 to cause a series of operational steps to be performed by processor set 1410 of computer 1401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1421 and the other storage media discussed below. The program instructions, and associated data, are accessed by processor set 1410 to control and direct performance of the inventive methods. In computing environment 1400, at least some of the instructions for performing the inventive methods can be stored in block 1445 in persistent storage 1413.

COMMUNICATION FABRIC 1411 is the signal conduction path that allows the various components of computer 1401 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1412 is any type of volatile memory now known or to be developed in the future. Examples include dynamic type random access memory (RAM) or static type RAM. Typically, the volatile memory is characterized by random access, but this is not required unless affirmatively indicated. In computer 1401, the volatile memory 1412 is located in a single package and is internal to computer 1401, but, alternatively or additionally, the volatile memory can be distributed over multiple packages and/or located externally with respect to computer 1401.

PERSISTENT STORAGE 1413 is any form of non-volatile storage for computers that is now known or to be developed in the future. The non-volatility of this storage means that the stored data is maintained regardless of whether power is being supplied to computer 1401 and/or directly to persistent storage 1413. Persistent storage 1413 can be a read only memory (ROM), but typically at least a portion of the persistent storage allows writing of data, deletion of data and re-writing of data. Some familiar forms of persistent storage include magnetic disks and solid-state storage devices. Operating system 1422 can take several forms, such as various known proprietary operating systems or open-source Portable Operating System Interface type operating systems that employ a kernel. The code included in block 1445 typically includes at least some of the computer code involved in performing the inventive methods.

PERIPHERAL DEVICE SET 1414 includes the set of peripheral devices of computer 1401. Data communication connections between the peripheral devices and the other components of computer 1401 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1423 can include components such as a display screen, speaker, microphone, wearable devices (such as goggles and smart watches), keyboard, mouse, printer, touchpad, game controllers, and haptic devices. Storage 1424 is external storage, such as an external hard drive, or insertable storage, such as an SD card. Storage 1424 can be persistent and/or volatile. In some embodiments, storage 1424 can take the form of a quantum computing storage device for storing data in the form of qubits. In embodiments where computer 1401 is required to have a large amount of storage (for example, where computer 1401 locally stores and manages a large database) then this storage can be provided by peripheral storage devices designed for storing large amounts of data, such as a storage area network (SAN) that is shared by multiple, geographically distributed computers. IoT sensor set 1425 is made up of sensors that can be used in Internet of Things applications. For example, one sensor can be a thermometer, and another sensor can be a motion detector.

NETWORK MODULE 1415 is the collection of computer software, hardware, and firmware that allows computer 1401 to communicate with other computers through WAN 1402. Network module 1415 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1415 are performed on the same physical hardware device. In other embodiments (for example, embodiments that utilize software-defined networking (SDN)), the control functions and the forwarding functions of network module 1415 are performed on physically separate devices, such that the control functions manage several different network hardware devices. Computer readable program instructions for performing the inventive methods can typically be downloaded to computer 1401 from an external computer or external storage device through a network adapter card or network interface included in network module 1415.

WAN 1402 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1403 is any computer system that is used and controlled by an end user (for example, a customer of an enterprise that operates computer 1401) and can take any of the forms discussed above in connection with computer 1401. EUD 1403 typically receives helpful and useful data from the operations of computer 1401. For example, in a hypothetical case where computer 1401 is designed to provide a recommendation to an end user, this recommendation would typically be communicated from network module 1415 of computer 1401 through WAN 1402 to EUD 1403. In this way, EUD 1403 can display, or otherwise present, the recommendation to an end user. In some embodiments, EUD 1403 can be a client device, such as thin client, heavy client, mainframe computer and/or desktop computer.

REMOTE SERVER 1404 is any computer system that serves at least some data and/or functionality to computer 1401. Remote server 1404 can be controlled and used by the same entity that operates computer 1401. Remote server 1404 represents the machine(s) that collect and store helpful and useful data for use by other computers, such as computer 1401. For example, in a hypothetical case where computer 1401 is designed and programmed to provide a recommendation based on historical data, then this historical data can be provided to computer 1401 from remote database 1430 of remote server 1404.

PUBLIC CLOUD 1405 is any computer system available for use by multiple entities that provides on-demand availability of computer system resources and/or other computer capabilities, especially data storage (cloud storage) and computing power, without direct active management by the scale. The direct and active management of the computing resources of public cloud 1405 is performed by the computer hardware and/or software of cloud orchestration module 1441. The computing resources provided by public cloud 1405 are typically implemented by virtual computing environments that run on various computers making up the computers of host physical machine set 1442, which is the universe of physical computers in and/or available to public cloud 1405. The virtual computing environments (VCEs) typically take the form of virtual machines from virtual machine set 1443 and/or containers from container set 1444. It is understood that these VCEs can be stored as images and can be transferred among and between the various physical machine hosts, either as images or after instantiation of the VCE. Cloud orchestration module 1441 manages the transfer and storage of images, deploys new instantiations of VCEs and manages active instantiations of VCE deployments. Gateway 1440 is the collection of computer software, hardware and firmware allowing public cloud 1405 to communicate through WAN 1402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1406 is similar to public cloud 1405, except that the computing resources are only available for use by a single enterprise. While private cloud 1406 is depicted as being in communication with WAN 1402, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1175 and private cloud 1176 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of some of the embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of some of the embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In some embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of some of the embodiments described herein.

Aspects of some of the embodiments described herein are described with reference to flowchart illustrations and/or block diagrams of methods, apparatus (systems), and computer program products according to some embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to some embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that some of the embodiments herein also can be implemented at least partially in parallel with one or more other program modules. Generally, program modules include routines, programs, components and/or data structures that perform particular tasks and/or implement particular abstract data types. Moreover, the described computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the various embodiments, but one of ordinary skill in the art can recognize that many further combinations and/or permutations of the various embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system comprising:
a processor that executes computer executable components stored in memory, wherein the computer executable components comprise:
an application identification component that identifies a new imperative application for which no recovery workflow artifacts or plans exist;
an analysis component that analyzes the new imperative application to determine resources required to be protected, wherein the analysis component further determines an order of steps to be performed within a workflow to guarantee recovery of the new imperative application; and
a recovery design component that utilizes a subset of legacy recovery plans from unrelated imperative applications to create a preliminary recovery plan for the new imperative application, executes the preliminary recovery plan, detects recovery failures during execution, and iteratively updates the preliminary recovery plan in response to the detected failures until a failure-free recovery plan is developed, the failure-free recovery plan restoring resources across multiple namespaces in a prescribed order.

2. The system of claim 1, wherein the recovery design component creates and validates a new workflow that restores the new imperative application to the desired recovery state in response to determining that existing workflows cannot restore the new imperative application to a desired recovery state.

3. The system of claim 1, wherein the recovery design component adds the failure-free recovery plan and the failures of the preliminary recovery plan to a database of known patterns to facilitate analysis when the failure-free recovery plan is designed.

4. The system of claim 3, wherein the recovery design component builds a generative artificial intelligence model to facilitate recovery plan design.

5. The system of claim 3, wherein the recovery design component modifies the new workflow to skip backup of unnecessary resources.

6. The system of claim 1, wherein the recovery deign component iteratively adjusts backups and workflows to optimize resource utilization by the failure-free recovery plan.

7. The system of claim 1, wherein the recovery design component modifies workflow of the failure-free recovery plan so that data is restored at a later point in the workflow if the data is missing or incorrect after recovery of a resource.

8. The system of claim 1, wherein creating the preliminary recovery plan comprises mapping resources from the unrelated imperative applications to corresponding resources of the new imperative application based on detected functional similarities.

9. The system of claim 1, wherein testing the preliminary recovery plan comprises executing the plan in a live or near-live containerized environment and detecting recovery failures by monitoring resource states across multiple namespaces.

10. The system of claim 3, wherein the prescribed order is determined dynamically based on dependencies discovered during iterative recovery testing.

11. The system of claim 1, wherein the failure-free recovery plan identifies resources to be restored and verifies their availability before restoration begins.

12. A computer-implemented method comprising:
identifying a new imperative application for which no recovery workflow artifacts or plans exist;
analyzing the new imperative application to determine resources required to be protected and determining an order of steps to be performed within a workflow to guarantee recovery of the new imperative application;

utilizing a subset of legacy recovery plans from unrelated imperative applications to create a preliminary recovery plan for the new imperative application;

executing the preliminary recovery plan;

detecting recovery failures during execution; and iteratively updating the preliminary recovery plan in response to the detected failures until a failure-free recovery plan is developed, the failure-free recovery plan restoring resources across multiple namespaces in a prescribed order.

13. The method of claim 12, wherein the recovery design in response to determining that existing workflows cannot restore the new imperative application to a desired recovery state, creates and validates a new workflow that restores the new imperative application to the desired recovery state.

14. The method of claim 12, wherein when the failure-free recovery plan is designed, adding the failure-free recovery plan and the failures of the preliminary recovery plan to a database of known patterns to facilitate analysis and other new imperative applications.

15. The method of claim 14, further comprising building a generative artificial intelligence model to facilitate recovery plan design.

16. The method of claim 12, further comprising iteratively adjusting backups and workflows to optimize resource utilization by the failure-free recovery plan.

17. The method of claim 12 further comprising modifying workflow of the failure-free recovery plan so that data is restored at a later point in the workflow if the data is missing or incorrect after recovery of a resource.

18. The method of claim 12, wherein creating the preliminary recovery plan comprises mapping resources from the unrelated imperative applications of the subset of legacy recovery plans to corresponding resources of the new imperative application based on detected functional similarities between the resources.

19. The method of claim 12, wherein testing the preliminary recovery plan comprises executing the plan within a staged containerized environment that replicates multiple namespaces of the new imperative application, and monitoring namespace-specific resource states to detect recovery failures.

20. A computer program product comprising a computer readable storage medium having program instructions embodied therewith, the program instructions executable by a processor to cause the processor to:

identify a new imperative application for which no recovery workflow artifacts or plans exist;

analyze the new imperative application to determine resources required to be protected, wherein analyzing further comprises determining an order of steps to be performed within a workflow to guarantee recovery of the new imperative application; and utilize a subset of legacy recovery plans from unrelated imperative applications to create a failure-free recovery plan for the new imperative application, execute the preliminary recovery plan, detect recovery failures during execution, and iteratively update the preliminary recovery plan in response to the detected failures until a failure-free recovery plan is developed, the failure-free recovery plan restoring resources across multiple namespaces in a prescribed order.

\* \* \* \* \*